United States Patent [19]
Fischer et al.

[11] 4,378,616
[45] Apr. 5, 1983

[54] ARRANGEMENT FOR MOUNTING A FLEXIBLE FILM OR THE LIKE

[75] Inventors: Artur Fischer, Weinhalde 34, 7244 Tumlingen, Waldachtal, Fed. Rep. of Germany; Gerhard Porlein, Tumlingen, Fed. Rep. of Germany

[73] Assignee: Artur Fischer, Tumlingen, Fed. Rep. of Germany

[21] Appl. No.: 198,240

[22] Filed: Oct. 17, 1980

[30] Foreign Application Priority Data

Oct. 22, 1979 [DE] Fed. Rep. of Germany ....... 2942634

[51] Int. Cl.³ ................................................ E04B 1/40
[52] U.S. Cl. ................................ 24/245 R; 24/211 M
[58] Field of Search ............ 24/245 R, 208 A, 211 L, 24/211 M, 211 P, 218, 217 W, 213 CS, 213 C

[56] References Cited

U.S. PATENT DOCUMENTS

| | | | |
|---|---|---|---|
| 490,709 | 1/1893 | Froehlich | 24/211 M |
| 528,580 | 11/1894 | Woolsey | 24/211 M |
| 607,023 | 7/1898 | Dowse | 24/211 M |
| 822,939 | 6/1906 | Gardner | 24/246 |
| 948,398 | 2/1910 | Larson | 24/246 |
| 1,201,154 | 10/1916 | Cupr | 24/218 |
| 1,567,129 | 12/1925 | Fife | 24/211 M |
| 1,571,001 | 1/1926 | Fenton | 24/218 |
| 2,162,275 | 6/1939 | Stanchfield | 24/218 |
| 2,211,586 | 8/1940 | Schwarz | 24/211 M |
| 2,364,266 | 12/1944 | Bryce | 24/211 L |
| 3,049,777 | 8/1962 | Lewin | 24/216 |
| 4,221,028 | 9/1980 | Fischer | 24/201 A |

*Primary Examiner*—Paul J. Hirsch
*Attorney, Agent, or Firm*—Michael J. Striker

[57] ABSTRACT

An arrangement for mounting a flexible film or the like on a substrate has an inner clamping member connected with a substrate and having an undercut portion adjacent to the latter, an outer clamping member surrounding the film in the region of the undercut portion of the inner clamping member so that the film is clamped between the inner and outer clamping members, and a disc-shaped carrying member associated with the outer clamping member so as to be pressed by the latter against the film and carrying a locking element arranged to lock the outer clamping member in clamping condition.

12 Claims, 2 Drawing Figures

ARRANGEMENT FOR MOUNTING A FLEXIBLE FILM OR THE LIKE

BACKGROUND OF THE INVENTION

The present invention relates to an arrangement for mounting a flexible film or the like, particularly for sealing a substrate.

An arrangement for mounting a flexible film or the like is known, which has an inner clamping member connected with a substrate and having an outer surface onto which a film is placed and an undercut portion adjacent to the substrate, and an outer clamping member surrounding the film in the region of the undercut portion of the inner clamping element so that the film is clamped between the inner and outer clamping members. The outer clamping member is formed as an open spring ring having end portions which are bent in direction away from one another. This arrangement is disclosed in the U.S. patent application Ser. No. 040,277 now U.S. Pat. No. 4,221,028. The arrangement allows to perform effectively the mounting of the flexible film on the substrate without drilling a throughgoing opening in the film. Thereby no sealing problems in the region of the mounting takes place, as in the arrangement requiring the drilling of the flexible film. When the flexible film is pulled into the undercut portion of the inner clamping member, folds can build in the mounting region. This is very undesirable both on aesthetical grounds and because the folds form hindrance to the flow of rain water. Furthermore, strong temperature variations, on the one hand, and pulsating suction loads acting upon the flexible film, on the other hand, can create in course of time, such condition in which the mounting becomes loose.

SUMMARY OF THE INVENTION

Accordingly, it is an object of the present invention to provide an arrangement for mounting a flexible film or the like on a substrate, which avoids the disadvantages of the prior art.

More particularly, it is an object of the present invention to provide an arrangement for mounting a flexible film or the like on a substrate which does not form folds on the film and remains tight for long time.

In keeping with these objects and with others which will become apparent hereinafter, one feature of the present invention resides in an arrangement which includes an inner clamping member connected with a substrate and having an outer surface onto which a film is placed, an outer clamping member surrounding the film in the region of an undercut portion of the inner clamping member so that the film is clamped between the inner and outer clamping members, and a disc-shaped carrying member associated with the outer clamping member so as to be pressed by the latter against the film and carrying locking means which is arranged for locking the outer clamping member in clamping condition.

More particularly, the dis-shaped carrying member is pressed by its peripheral edge against the upper surface of the flexible film or the like, and outwardly bent end portions of the outer clamping member formed as a spring ring are locked by the locking means provided on the disc-shaped carrying member.

In order to mount a flexible film or the like on a substrate the inner clamping member is connected with the substrate, whereupon the film is placed onto the outer surface of the inner clamping member. Then the spring ring which is arranged on the disc-shaped carrying member is placed onto the film which has been already placed onto the inner clamping member. Before engagement of the spring ring into the undercut portion of the inner clamping member, the peripheral edge of the curved disc-shaped carrying member firmly abuts against the flexible film and thereby prevents pulling of the flexible film from the outer surface of the substrate into the undercut portion of the inner clamping member. The constriction of the flexible film in the region of the undercut portion is attained by stretching of the film which substantially excludes the formation of folds. Tightening of the disc-shaped carrying element is performed by the spring ring engaged in the undercut portion of the inner clamping member. Moreover, the disc-shaped carrying elements prevent direct transmission to the spring ring of a flatter movement which takes place in condition of suction loading.

In accordance with another feature of the present invention, the locking means of the disc-shaped carrying member includes a locking element which fixes the bent end portions of the spring ring in clamping condition, when the spring ring engages in the undercut portion of the outer clamping member. Such an arrangement guarantees safety of the mounting during long time and in extreme conditions.

The first locking element may be formed as a bracket which is provided with fixing projections engageable with the end portions of the spring ring and fixing the same in the clamping condition. The bracket is preferably of one piece with the disc-shaped carrying member, for example injection molded on the same, which guarantees a high stability. The arresting projections of the bracket form receiving grooves, and the end portions of the spring member displace over inclined surface of the arresting projections whereupon they engage into the receiving grooves.

In accordance with a further feature of the present invention, a shackle is provided on the disc-shaped carrying member at a distance from the bracket. The shackle presses the bent end portions of the spring ring against the bracket, when the bent end portions of the spring ring are fixed in the bracket. Thereby the bent end portions of the spring ring are firmly pressed in the receiving grooves of the bracket. In such an arrangement the spring ring is maintained in its locked position even in condition of high loads acting upon the mounting.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
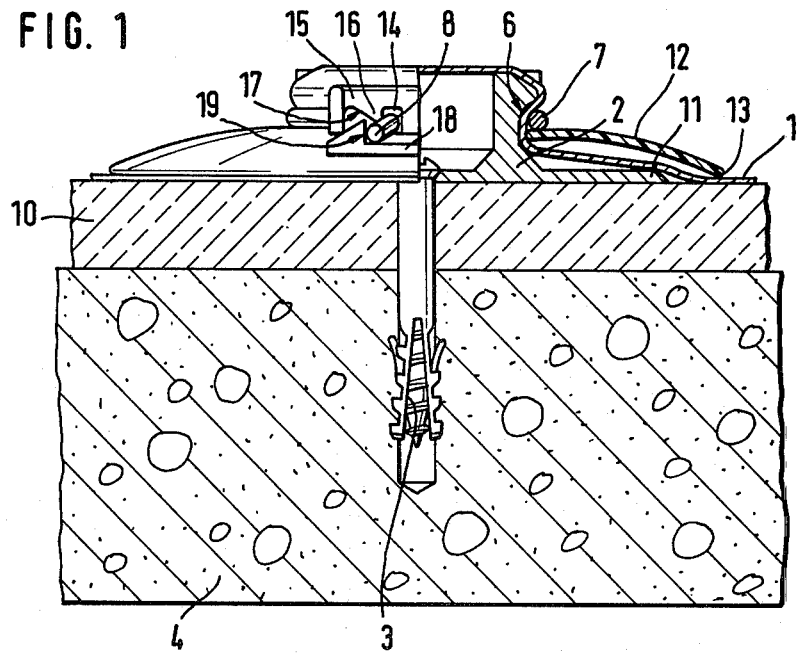
FIG. 1 is a view showing a section of an arrangement for mounting a flexible film on a substrate.
Figure 2:
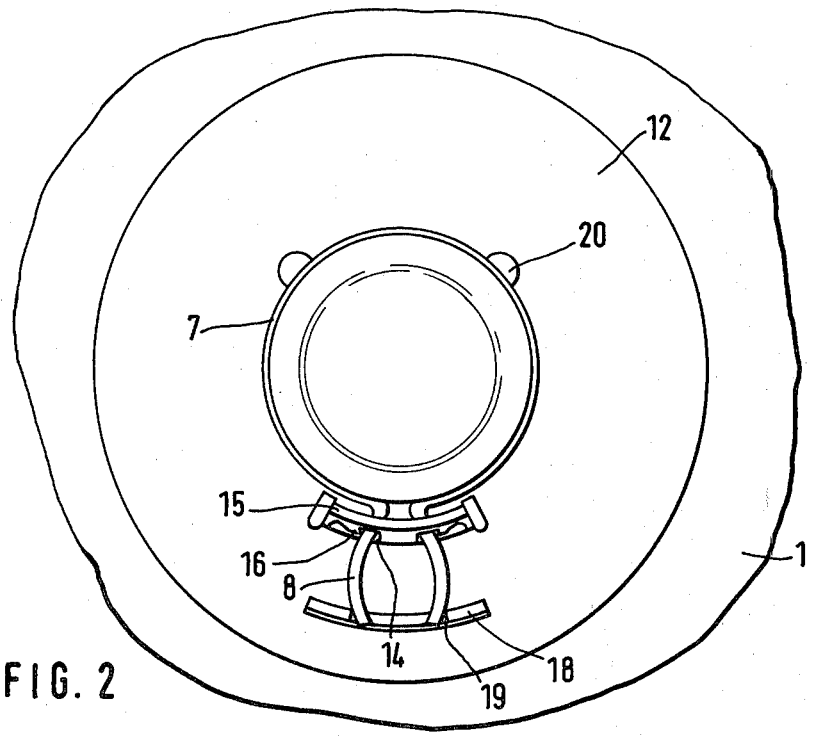
FIG. 2 is a plan view of the arrangement shown in FIG. 1.

An arrangement for mounting a flexible film 1 on a substrate 4 includes an inner clamping member which is identified by reference numeral 2 and an outer clamping member which is identified by reference numeral 7.

The inner clamping member 2 is connected with the substrate 4 by a mounting element 3. The inner clamping member 2 has an undercut portion 6 on its periphery. An insulating plate 10 can be arranged on the substrate 4 for insulating purposes. In order to mount the insulating plate 10 on the substrate 4, the supporting surface of the inner clamping member 2 is enlarged by a flange portion 11.

In order to mount the film 1 on the substrate, the inner clamping member 2 is first connected with the substrate 4 by the mounting element 3. Then the film 1 is placed onto the inner clamping member 2. After this, a disc-shaped carrying member 12 with the outer clamping member 7 is placed onto the film and onto the inner clamping member 2.

The outer clamping member 7 is formed as a spring ring. The disc-shaped carrying member 12 has a curved cross-section, or more particularly is concave. As can be seen from FIG. 1, the hollow of the concave disc-shaped carrying member 12 faces toward the substrate 4 and toward the film 1. Before the spring ring 7 engages in the undercut portion 6 of the inner clamping member 2, an outer edge portion 13 of the concave disc-shaped carrying member 12 firmly abuts against the film 1 and prevents pulling of the film 1 outside of the disc-shaped carrying member 12. The film is pulled into the undercut portion 6 of the inner clamping member 2 under the action of the spring ring 7 because of stretching of the film in the region located inside the disc-shaped carrying element 12.

The disc-shaped carrying element 12 is provided with a bracket 15. The latter has arresting projections 16 which form arresting grooves 14. On the other hand, the arresting projections 13 form additional grooves, or more particularly the arresting projections 16 have inclined initial faces 17. The spring ring 7 has end portions 8 which are bent in direction away from one another or in diametrically opposite direction relative to the axis of the spring 7. Before placing the spring ring 7 onto the film, the bent end portions 8 of the latter are so bent that they are located outside of the arresting grooves 14 formed by the arresting projections 16 of the bracket 15. This facilitates the engagement of the spring ring 7 into the undercut portion 6 of the inner clamping member 2.

When the spring ring 7 engages into the undercut portion 6 of the inner clamping member 2, the bent end portions 8 of the spring rign 7 are pressed together by pliers. Thereby, the bent end portions 8 of the spring ring 7 slide over the inclined faces 17 of the arresting projections 16 and engage into the arresting grooves 14 of the bracket 15. This engagement is a final step of the process of locking of the spring ring 7 and mounting of the film.

The disc-shaped carrying member 12 is further provided with a shackle 18 which preferably is of one-piece with the former, for example, injection molded on the disc-shaped carrying member 12. As will be explained hereinbelow, the shackle 18 is provided when the arrangement is to be utilized in extreme weather conditions and over years of service life. The shackle 18 is arranged at a distance from the bracket 15, and more particularly farther from the axis of the spring ring 7 than the bracket 15. The end portions 8 of the spring member 7 in engaged condition abut against the shackle 18. Thereby the end portions 8 are firmly pressed in the arresting grooves 14 of the bracket 15. Abutment edges 19 are provided at both sides of the shackle 18 so as to prevent sliding of the end portions 8 of the spring ring 7 from the shackle 18. The spring ring 7 is held on the disc-shaped carrying member 12 by the bracket 15 which embraces the bent end portions 8 of the spring 7, and by holding projections 20 arranged at a location which is opposite to the bracket 15.

It will be understood that each of the elements described above, or two or more together, may also find a useful application in other types of arrangements differing from the types described above.

While the invention has been illustrated and described as embodied in an arrangement for mounting a flexible film or the like on a substrate, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt if for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for mounting a flexible film or the like, particularly to seal a substrate, comprising an inner clamping member connected with a substrate and having an outer surface onto which a film is placed, said inner clamping member having an undercut portion adjacent to the substrate; an outer clamping member surrounding the film in the region of said undercut portion of said inner clamping member so that the film is clamped between said inner and outer clamping members, said outer clamping member being a spring ring which is open and has two end portions which are bent in direction away from one another; a disc-shaped carrying member associated with said outer clamping member so that the latter presses said disc-shaped carrying member against the film; and locking means provided on said disc-shaped carrying member and arranged for locking said outer clamping member in clamping condition, said locking means including a first locking element provided with arresting projections which fix said bent end portions of said spring ring in the clamping condition, and a second locking element which is spaced from said first locking element and arranged to press said bent end portions of said outer clamping member against said first locking element.

2. An arrangement as defined in claim 1, wherein said outer clamping member is a spring ring which is received and arrested in the region of said undercut portion of said inner clamping member.

3. An arrangement as defined in claim 2, wherein said spring ring is open and has two end portions which are bent in direction away from one another.

4. An arrangement as defined in claim 3, wherein said spring ring has an axis, said end portions of said spring ring being bent in diametrically opposite directions.

5. An arrangement as defined in claim 1, wherein said disc-shaped carrying member has a curved cross-section.

6. An arrangement as defined in claim 5, wherein said disc-shaped carrying member is concave and has a recess facing toward the substrate and thereby toward the film.

7. An arrangement as defined in claim 6, wherein said disc-shaped carrying member has a peripheral edge portion which is pressed by said outer clamping member into abutment against the film.

8. An arrangement as defined in claim 7, wherein said disc-shaped carrying member is arranged between said outer carrying member and the film.

9. An arrangement as defined in claim 1, wherein said disc-shaped carrying member has an outer surface facing away from the substrate and thereby from the film, said locking means being arranged on said outer surface of said disc-shaped carrying member.

10. An arrangement as defined in claim 1, wherein said arresting projections of said first locking element form arresting grooves in which said bent end portions of said spring ring engage and are fixed in the clamping condition.

11. An arrangement as defined in claim 10, wherein said arresting projections of said first clamping member also form additional arresting grooves in which said bent end portions engage in nonclamped condition and from which said bent end portions can be displaced into said first-mentioned arresting grooves.

12. An arrangement as defined in claim 1, wherein said spring ring has an axis, said first locking element being located closer to and said second locking element being located farther from said axis of said spring ring.

* * * * *